US008744767B2

(12) United States Patent
Hayashida et al.

(10) Patent No.: US 8,744,767 B2
(45) Date of Patent: Jun. 3, 2014

(54) SEGMENT DEFINING METHOD, TRAVEL TIME CALCULATION DEVICE, AND DRIVING SUPPORT DEVICE

(75) Inventors: Teruhide Hayashida, Tokyo (JP); Satomi Yoshioka, Yokohama (JP); Hiroki Nakashima, Kawasaki (JP); Hideo Ito, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/813,502

(22) PCT Filed: Aug. 5, 2011

(86) PCT No.: PCT/JP2011/067973
§ 371 (c)(1),
(2), (4) Date: Mar. 15, 2013

(87) PCT Pub. No.: WO2012/018122
PCT Pub. Date: Feb. 9, 2012

(65) Prior Publication Data
US 2013/0173153 A1    Jul. 4, 2013

(30) Foreign Application Priority Data
Aug. 6, 2010    (JP) .................................. 2010-177891

(51) Int. Cl.
*G01C 21/34*    (2006.01)
(52) U.S. Cl.
USPC ....... 701/527; 701/533; 701/534; 340/995.19
(58) Field of Classification Search
USPC .......................... 340/988–996; 701/410–430; 342/357.2–357.78
See application file for complete search history.

(56) References Cited

U.S. PATENT DOCUMENTS

| | | | |
|---|---|---|---|
| 2003/0142627 A1* | 7/2003 | Chiu et al. ..................... 370/238 |
| 2005/0060395 A1* | 3/2005 | Korotky ......................... 709/223 |
| 2006/0082472 A1* | 4/2006 | Adachi et al. ............. 340/995.13 |
| 2006/0235739 A1* | 10/2006 | Levis et al. ........................ 705/9 |
| 2008/0071466 A1* | 3/2008 | Downs et al. .................. 701/117 |
| 2009/0037100 A1* | 2/2009 | Fujiwara et al. ............... 701/209 |
| 2010/0106398 A1* | 4/2010 | Eisele et al. .................. 701/200 |
| 2010/0114473 A1* | 5/2010 | Kono et al. .................... 701/200 |
| 2011/0307166 A1* | 12/2011 | Hiestermann et al. ........ 701/119 |
| 2012/0089327 A1* | 4/2012 | Miura et al. ................... 701/411 |

(Continued)

FOREIGN PATENT DOCUMENTS

| | | |
|---|---|---|
| JP | A-2002-206935 | 7/2002 |
| JP | A-2003-337038 | 11/2003 |

(Continued)

OTHER PUBLICATIONS

Jan. 28, 2014 European Search Report issued in European Patent Application No. 11814747.9.

*Primary Examiner* — John R Olszewski
*Assistant Examiner* — Tommy Worden
(74) *Attorney, Agent, or Firm* — Oliff PLC (57) ABSTRACT

A section defining method separates a road between a departure point and a destination point into a plurality of links under a predetermined condition and defines a section based on a link cost, which is an index indicating ease of travel and set for each link. The section is used to generate guide information provided to a driver of a vehicle. The section is defined by combining, among the plurality of links between the departure point and the destination point, at least two continuous links that yield a decrease in standard deviation, which is based on sums of the link costs.

7 Claims, 8 Drawing Sheets

(56) References Cited

U.S. PATENT DOCUMENTS

2013/0173153 A1* 7/2013 Hayashida et al. ........... 701/527

FOREIGN PATENT DOCUMENTS

| JP | 2004125562 A * | 4/2004 |
| JP | A-2004-125562 | 4/2004 |
| JP | A-2005-195329 | 7/2005 |
| JP | A-2005-233815 | 9/2005 |
| JP | A-2005-316623 | 11/2005 |
| JP | A-2006-048346 | 2/2006 |
| JP | A-2008-241605 | 10/2008 |
| JP | A-2009-031039 | 2/2009 |
| JP | A-2009-157617 | 7/2009 |

* cited by examiner

| NO | Link L1 | | Link L2 | | Link L3 | | Link L4 | |
|----|--------|-------------------|--------|-------------------|--------|-------------------|--------|-------------------|
|    | Signal | Travel Time (sec) | Signal | Travel Time (sec) | Signal | Travel Time (sec) | Signal | Travel Time (sec) |
| ① | Stop | 84 | Go | 23 | Go | 31 | Stop | 89 |
| ② | Go | 21 | Stop | 87 | Go | 31 | Stop | 85 |
| ③ | Stop | 96 | Go | 17 | Go | 26 | Stop | 103 |
| ④ | Go | 18 | Stop | 90 | Go | 30 | Stop | 84 |
| ⑤ | Go | 20 | Go | 22 | Stop | 108 | Go | 22 |
| ⑥ | Stop | 75 | Go | 27 | Go | 23 | Stop | 91 |
| ⑦ | Stop | 105 | Go | 19 | Go | 29 | Stop | 96 |
| ⑧ | Stop | 86 | Go | 21 | Go | 26 | Go | 17 |
| ⑨ | Stop | 84 | Go | 17 | Go | 25 | Stop | 89 |
| ⑩ | Stop | 76 | Go | 23 | Go | 31 | Stop | 84 |

Fig.6

|  | Link L1 | Link L2 | Link L3 | Link L4 |
|---|---|---|---|---|
| Average Travel Time (sec) | 66 | 34 | 36 | 76 |
| Standard Deviation (sec) | 31.7 | 27.1 | 24.2 | 28.8 |
| Standard Error (sec) | 10 | 8.6 | 7.7 | 9.1 |
| Standard Error Rate (sec) | 15% | 25% | 21% | 12% |

Fig.7(a)

| Section Average Travel Time | Standard Deviation | Standard Error (sec) | Standard Error Rate |
|---|---|---|---|
| 101 | 20.9 | 4.7 | 5% |

Fig.7(b)

| Section Average Travel Time | Standard Deviation | Standard Error (sec) | Standard Error Rate |
|---|---|---|---|
| 137 | 8.73 | 1.6 | 1% |

Fig.7(c)

| Section Average Travel Time | Standard Deviation | Standard Error (sec) | Standard Error Rate |
|---|---|---|---|
| 213 | 28.9 | 4.5 | 2% |

SEGMENT DEFINING METHOD, TRAVEL TIME CALCULATION DEVICE, AND DRIVING SUPPORT DEVICE

TECHNICAL FIELD

The present invention relates to a section defining method for defining a section based on link costs on roads, a travel time calculation device that calculates the travel time for the defined section, and a drive assistance device that assists driving based on the defined section.

BACKGROUND ART

A typical drive assistance device mounted on a vehicle, such as a car navigation system, calculates the travel time taken to travel from the present location of the vehicle to a destination as well as the shortest route to the destination by using traffic information, which is provided from the Vehicle Information and Communication System (VICS). VICS, which is used for drive assistance, collects various types of traffic information, such as congestion, travel time for different sections, and traffic restrictions, at a management center, referred to as the VICS center, and distributes the traffic information to drive assistance devices via communication media, such as radio beacons, infrared beacons, and FM multiplex broadcasting. Based on the received traffic information, the drive assistance device selects a recommended route from the present location to the destination and notifies the driver of the selected route.

The drive assistance device calculates a recommended route by referring to link costs, which are set for "links", that is, predetermined road sections separated by traffic lights or intersections. A link cost serves as an index indicating mobility in each link (or ease of traveling in each link). The link cost information includes, for example, average travel time and road width. The drive assistance device refers to the link costs set for each link in each route from the present location to the destination to select a route that minimizes the link costs. However, the link costs calculated within the same link may differ depending on the vehicle that is subject to measurement or the timing at which the travel time is measured. This is because vehicles stop and start traveling in accordance with changes in the states of the traffic lights, which turn red (stop) or green (go). In other words, the link cost may vary within the same link. The link costs may also vary due to changes in the amount of traffic and the occurrence of traffic accidents. The standard error of the link costs would be large when the link costs calculated within the same link vary greatly. This lowers the reliability of the calculated travel time and the selected recommended route, which are based on the link costs.

Accordingly, patent document 1 describes a method that obtains the standard deviation of link costs for each link, which indicates the variation of the link costs, by using past statistical values of the link costs for each link. The calculated standard deviation is used as a risk factor when calculating the recommended route. With this method, a route having a small risk factor is selected as a reliable route. However, the selected route having a small risk factor may not be the shortest route to the destination. The selected route having a small risk factor may be longer than necessary. Thus, this method does not necessarily select a preferable route in terms of practicability.

Patent document 2 describes a method that determines a difference in the travel time between adjacent links based on the standard deviations of the links. When determined that the difference is large in the travel time between the adjacent links, the travel times of the links is determined as being abnormal values and removed from the database. Thus, the database accumulates travel times from which abnormal values have been excluded. However, the travel times (link costs) can often vary greatly between adjacent links under actual road situations due to traffic information, such as vehicles stopping and starting at traffic lights. If such travel times are uniformly excluded, it is difficult to build the travel time accumulation database reflecting the actual traffic conditions.

Accordingly, patent document 3 describes a method that obtains an average value from the median value of the travel time for each link acquired from the VICS and the arithmetic means value of the travel time for each link based on probe information collected by vehicles. The average value is used as a link cost. This method uses the probe information collected from vehicles in addition to the traffic information obtained from the VICS and thereby improves the reliability of the calculated link cost.

PRIOR ART DOCUMENTS

Patent Documents

Patent Document 1: Japanese Laid-Open Patent Publication No. 2002-206935
Patent Document 2: Japanese Laid-Open Patent Publication No. 2005-195329
Patent Document 3: Japanese Laid-Open Patent Publication No. 2005-233815

SUMMARY OF THE INVENTION

However, even when the traffic information obtained from the VICS and the probe information are both used to calculate the link cost for each link, the link cost still reflects changes in the traveling state of the vehicles subject to measurement, changing states of the traffic lights, and changing road situations. These changing factors can cause the link costs to vary within the same link. In particular, a shorter section that is defined as a link increases variations in the link costs within the same link. This increases the standard error of the link cost.

In this manner, there is still room for improvements in terms of practicability when calculating and using the link cost to calculate the travel time and provide drive assistance.

It is an object of the present invention to provide a section defining method for defining a section having high reliability, a travel time calculation device that has high accuracy, and a drive assistance device that assists driving in a reliable manner.

To achieve the above object, one aspect of the present invention is a section defining method that separates a road between a departure point and a destination point into a plurality of links under a predetermined condition and defines a section based on a link cost, which is an index indicating ease of travel and set for each link. The section is used to generate guide information provided to a driver of a vehicle. The method includes defining the section by combining, among the plurality of links between the departure point and the destination point, at least two continuous links that yield a decrease in standard deviation, which is based on sums of the link costs.

A larger standard deviation of the link cost indicates a larger variation of the link cost, as well as a larger rate of error occurring in guide information generated based on the link cost. A smaller standard deviation of the link cost means a higher accuracy of guide information generated based on the link cost. In other words, guide information generated based on the link cost having a smaller standard deviation has a higher accuracy. The standard deviation of the link cost can be reduced by combining at least two continuous links into one section and calculating the link cost for the section based on the sum of link costs for the combined links, as compared with when the link cost for each separate link is used.

With the above method, a section for which the link cost has a smaller standard deviation is newly defined by combining continuous links that yield a decrease in the standard deviation based on the sums of link costs. The guide information is then generated based on the sum of link costs within the defined section. With this method, guide information with a higher accuracy can be generated, and the reliability of the guide information can be improved.

Preferably, the section that combines at least two continuous links that yield a decrease in standard deviation, which is based on sums of link costs, is defined as a single section unit.

With the above method, a section is newly defined as a section unit by combining continuous links that yield a decrease in standard deviation, instead of setting each of the links separating the road between the departure point and the destination point as a section unit. The link cost is then calculated for the defined section unit. With this method, the link cost with a higher accuracy can be calculated for the defined section, and guide information with a higher accuracy can be generated for the defined section.

Preferably, a plurality of section units are defined by sequentially repeating following steps (I) and (II) from the departure point;

(I) a step of combining at least two continuous links that yield a decrease in standard deviation, which is based on sums of link costs; and (II) a step of setting the link combination obtained in step (I) as the single section unit when a standard deviation that is based on the sums of the link costs obtained when the link combination obtained in step (I) is combined with the next continuous link is greater than the standard deviation corresponding to the link combination obtained in step (I).

With the above method, the two steps, that is, combining the continuous links and defining the section unit, are performed repeatedly so that the section is extended to add continuous links one after another as long as the sums of link costs for the combined continuous links is smaller. By repeating these steps, the road between the departure point and the destination point is seamlessly defined into a plurality of section units. With this method, the section can be easily defined to yield a smaller standard deviation based on the sum of link costs, and also the section can be defined by combining a required minimum number of link costs. In other words, this method enables more practical defining of sections by combining continuous links into each section in a manner to yield a smaller standard deviation.

Preferably, the link cost is calculated based on at least one element of travel time, fuel consumption amount, road width, and distance in the corresponding link.

Normally, the guide information provided to the driver of the vehicle can be various types of information including a recommended route from the departure point to the destination point and the travel time to the destination point. The guide information can be generated based on the link cost for each link calculated based on at least one of the travel time, the fuel consumption amount, the road width, the road shape, and the distance in the corresponding link. With this method, the link cost with a higher accuracy can be calculated based on these elements, and various sets of guide information having a higher accuracy can be generated based on the calculated link cost.

Preferably, the element used for calculating the link cost is collected based on information transferred from a plurality of vehicles having wireless communication capabilities that are traveling along the same link to a management center of a probe information communication system. The link cost evaluated when defining the section is calculated at the management center. The section is defined at the management center based on the calculated link cost.

With the above method, the elements used to calculate the link cost are collected based on probe information, that is, information transferred from a plurality of vehicles traveling along the same link to the management center of the probe information communication system. This enables various types of information indicating ease of travel to be collected from the vehicles that are actually traveling along the road. The collected information is managed at the management center of the probe information communication system. The sections are then defined at the management center. This enables the collection of the elements used to calculate the link cost and the defining of sections based on these elements to be performed at one place, or at the management center.

A further aspect of the present invention provides a travel time calculation device that separates a road between a departure point and a destination point into a plurality of links under a predetermined condition and calculates travel time based on travel time information included in a link cost, which is an index indicating ease of travel and set for each link. The travel time is used to generate guide information provided to a driver of a vehicle. The travel time calculation device calculates the travel time for each section defined by above the section defining method as an average value of the travel times of links included in the corresponding section.

With the above structure, the travel time for each section defined with the above section defining method is calculated as the average value of the travel times of links included in each section, which is defined by combining links in a manner to yield a decrease in the standard deviation of the sums of the link costs. This enables the travel time to be calculated for each section based on elements with smaller variations, and also minimizes an error between the calculated travel time and the actual travel time for each section. This improves the reliability of the travel time, which is used to generate guide information.

Preferably, the travel time for each link and the travel time for each defined section are calculated at a management center of a probe information communication system based on information transferred to the management center from a plurality of vehicles having wireless communication capabilities that are traveling along the same link. Among the calculated travel times, the travel time for each defined section is provided from the management center in response to a request.

With the above structure, the travel time for each section, which is used to calculate the link cost, is collected based on probe information, that is, information transferred from a plurality of vehicles traveling along the same link to the management center of the probe information communication system. In this case, the actual travel time required by each vehicle traveling along the road can be obtained. The calculation is then performed at the management center based on the travel time obtained from each vehicle. This enables the collection of travel times, the defining of sections, and the calculation and distribution of the travel time for the defined section to be managed at one place, namely, at the management center.

Further, with the above structure, information related to the travel time for each section can be distributed to a drive assistance device of a vehicle or to an individual terminal in response to a request from the device or terminal provided with a wireless communication capability or communication means including the Internet. This improves practical use of the travel time calculated for the defined section based on the link cost.

Another aspect of the present invention is a drive assistance device that separates a road between a departure point and a destination point into a plurality of links under a predetermined condition and generates route information, which is provided to a driver of a vehicle, based on travel time information or a fuel consumption amount that are included in a link cost, which is an index of ease of travel and set for each link. The drive assistance device calculates travel time or fuel consumption amount for each section defined with the above section defining method as an average value of the travel times or the fuel consumption amounts of links included in each section and generates the route information based on the calculated travel time or fuel consumption amount.

With the above structure, the travel time for each section defined with the above section defining method is calculated as the average value of the travel times or the fuel consumption amounts of links included in each section, which is defined by combining links in a manner to yield a decrease in the standard deviation of the sums of the link costs. This enables the travel time or the fuel consumption amount to be calculated for each section based on elements with smaller variations, and also minimizes an error between the calculated travel time or the calculated fuel consumption amount and the travel time or the fuel consumption amount actually required to travel on each section. This improves the reliability of route information, which is generated based on the travel time or the fuel consumption amount, and improves the reliability of the drive assistance device.

Preferably, the travel time or the fuel consumption amount for each link and the travel time or the fuel consumption amount for each defined section are calculated at a management center of a probe information communication system based on information transferred to the management center from a plurality of vehicles having wireless communication capabilities that are traveling along the same link. Among the calculated travel times or fuel consumption amounts, the travel time or the fuel consumption for each defined section is provided as information used to generate the route information from the management center in response to a request.

With the above structure, the travel time for each section, which is used to calculate the link cost, is collected based on probe information, or information transferred from a plurality of vehicles traveling along the same link to the management center of the probe information communication system. In this case, the travel time or the fuel consumption amount actually required by each vehicle driving on the road can be obtained. The calculation is then performed at the management center based on the travel time or the fuel consumption amount obtained from each vehicle. This enables the collection of the travel times and fuel consumption amounts, the defining of sections, and the calculation and distribution of the travel time and the fuel consumption amount for the defined section to be managed at one place, namely, the management center.

The drive assistance device having the above structure can obtain information related to the travel time or the fuel consumption amount for each section in response to a request provided with, for example, wireless communication capabilities, and enables assistance by providing route information while requiring a minimum amount of calculation and a minimum amount of information.

DETAILED DESCRIPTION OF THE PREFERRED EMBODIMENTS

Figure 1:
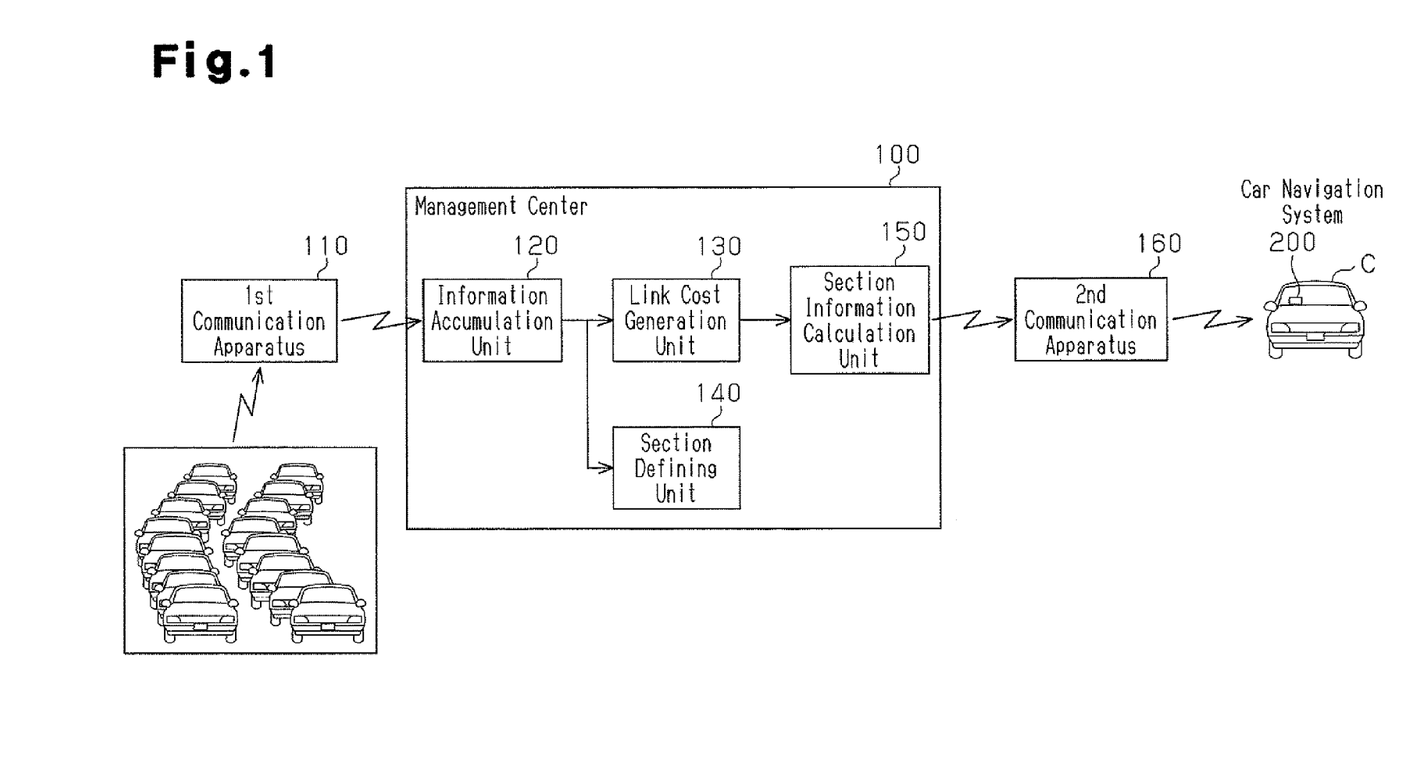
FIG. 1 is a conceptual block diagram of a system related with a section defining method, a travel time calculation device, and a drive assistance device according to one embodiment of the present invention.
Figure 2:
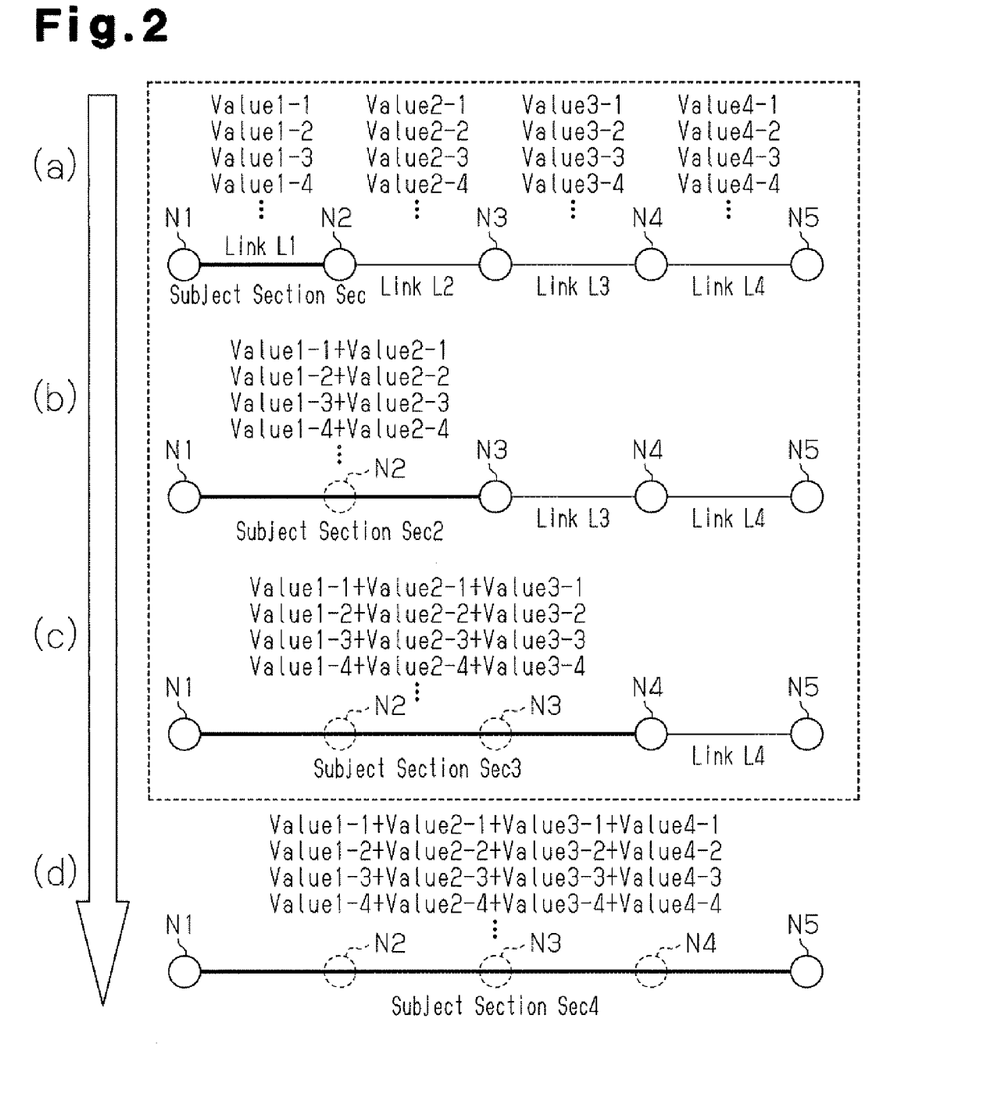
FIGS. 2(a) to 2(d) are diagrams showing the definition of sections.

FIG. 1 is a conceptual diagram of a system related with a section defining method, a travel time calculation device, and a drive assistance device according to an embodiment of the present invention.

As shown in FIG. 1, the system includes a management center 100, which functions as a probe information communication system for collecting and managing probe information transmitted from vehicles. The probe information collected at the management center 100 includes information related to the location and traveling speed of each vehicle, the fuel consumption amount, and time information. The probe information is transmitted to a first communication apparatus 110, which is installed in each predetermined area, via communication means such as an in-vehicle communication device, which is installed in each vehicle. The probe information accumulated by the first communication apparatus 110 is provided to the management center 100 in predetermined time intervals.

The probe information associated with each vehicle, which has been provided to the management center 100, is first input to an information accumulation unit 120, which accumulates such probe information. The probe information, which has been input to the information accumulation unit 120, is classified into different links, which are areas in a continuous road separated by nodes, or for example intersections or traffic lights. The probe information, which has been classified into different links and accumulated by the information accumulation unit 120, is output to a link cost generation unit 130, which generates a link cost for each link based on the probe information. The link cost for each link serves as an index indicating ease of travel on each link.

The link cost generation unit 130 calculates, as the link cost for each link, the travel time required by each vehicle that has traveled along each link and the consumed amount of fuel based on various elements of information provided as the probe information, such as the location of each vehicle, the drive speed, and the fuel consumption amount.

Information related to the link cost calculated by the link cost generation unit 130 is then sent to a section defining unit 140, which defines sections used to generate guide information provided to the driver of each vehicle based on the link cost. The section defining unit 140 combines two or more continuous links that yield a decrease in standard deviation based on the sum of the link costs. In the present embodiment, each section including a plurality of links that are combined by the section defining unit 140 is defined as a single section unit. When, for example, the standard deviation of a link cost for a certain link is greater than a standard deviation based on the sum of the link costs for that certain link and a continuous link, the two continuous links are combined to form a single section.

In the present embodiment, each single section unit is defined by sequentially repeating steps (I) and (II) described below from a link corresponding to the starting point for defining sections.

(I) At least two continuous links are combined to yield a decrease in the standard deviation based on the sum of link costs.

(II) The link combination obtained in step (I) is defined as a single section unit when a standard deviation based on the sum of the link costs obtained when combining the link combination obtained in step (I) with the next continuous link is greater than the standard deviation corresponding to the link combination obtained in step (I), Through this section defining process, the road along which the vehicle is driven is divided into predetermined sections.

After each section for which guide information is to be generated is defined, information related to each defined section and information related to the link cost generated by the link cost generation unit 130 for each defined section are output to a section information calculation unit 150. The section information calculation unit 150 averages, for each defined section, the link costs for the links in the section, that is, averages the travel times and the fuel consumption amounts for each section. The average travel time and average fuel consumption amount for each section is then associated with the corresponding section as the actual travel time and fuel consumption amount that would be required by each vehicle when traveling along each section. As a result, each section is associated with information related to the travel time and the fuel consumption amount generated based on link costs having a small standard deviation, or small variations. In other words, each section is associated with information related to the travel time and the fuel consumption amount minimizing errors in the actual travel time and the fuel consumption amount when traveling along each section. In the present embodiment, the section information calculation unit 150 corresponds to a travel time calculation device.

A car navigation system 200 may be mounted on a vehicle C to generate route information for the driver. The car navigation system 200 may provide a request for information related to the travel time associated with each section. In response to such a request, the requested information is distributed to the car navigation system 200 via a second communication apparatus 160.

When receiving the information related to the travel time and the fuel consumption amount associated with each section from the management center 100, the car navigation system 200 searches for a route that minimizes the travel time or the fuel consumption amount by using the received information as an index based on, for example, Dijkstra's algorithm. After the route search, a recommended route from the departure point to the destination point as well as the estimated time of arrival is provided to the driver through a display device or a voice device (not shown). In the present embodiment, the management center 100 and the car navigation system 200 function as the device assistance device.

In the present embodiment, the travel time averaged for the section unit including continuous sections combined to yield a decrease in the standard deviation is used as an index for selecting a route. This reduces errors in the estimated time of arrival at the destination point from the actual time of arrival. Also, the fuel consumption amount averaged for the defined section unit is used as an index in selecting a route that minimizes the fuel consumption amount. The route selected in this manner would actually require a smaller amount of fuel consumption. This improves the reliability of the guide information provided to the driver of the vehicle C and thus improves the reliability of the drive assistance device.

A method for defining sections according to the present embodiment will now be described in more detail with reference to FIGS. 2 to 8. FIGS. 2(a) to 2(d) show combinations of continuous links. FIGS. 3(a) and 3(b) and FIGS. 4(a) and 4(b) show the sums of link costs for different combinations of continuous links in correspondence with FIGS. 2(a) to 2(d).

As shown in FIG. 2(a), the road is separated into links L1 to L4 by nodes N1 to N5, which are formed by traffic lights or intersections. The links L1 to L4 are each associated with values of the link cost calculated based on probe information, which is provided from vehicles that are traveling along links L1 to L4. More specifically, link L1 is associated with values 1-1, 1-2, 1-3, 1-4, and so on, link L2 is associated with values 2-1, 2-2, 2-3, 2-4, and so on, link L3 is associated with values 3-1, 3-2, 3-3, 3-4, and so on, and link L4 is associated with values 4-1, 4-2, 4-3, 4-4, and so on.

In the section defining process, a link corresponding to the starting point for defining sections is first selected. The link corresponding to the starting point (first link) is preferably a link that is not included in any section that has been defined as a single section unit or a link corresponding to the beginning or the end of a road. The beginning or the end of a road may be, for example, a highway interchange or an intersection of main roads.

Figure 3A:
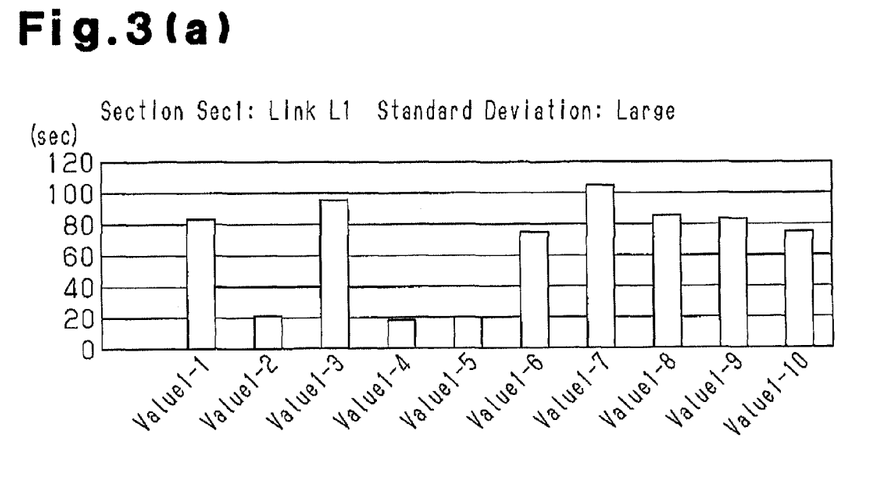
FIGS. 3(a) and 3(b) are graphs showing the standard deviation based on the sum of link costs included in the defined sections.

In the present example, as shown in FIG. 2(a), link L1 is selected as the starting point of a section, and the standard deviation of the link cost of link L1, which indicates variations in the link cost of link L1, is calculated, assuming that link L1 defines a subject section Sec1. The distribution of travel times in link L1 used as the link cost for link L1 is shown in FIG. 3(a). As shown in FIG. 3(a), the travel times in link L1 vary greatly. If link L1 is set as a subject section, the standard deviation of the link cost would be large. Such variation in the link cost may occur when the section is short and vehicles stop and start in accordance with the traffic lights separating link L1, which change states to allow driving (turn green) or stop driving (turn red).

Figure 3B:
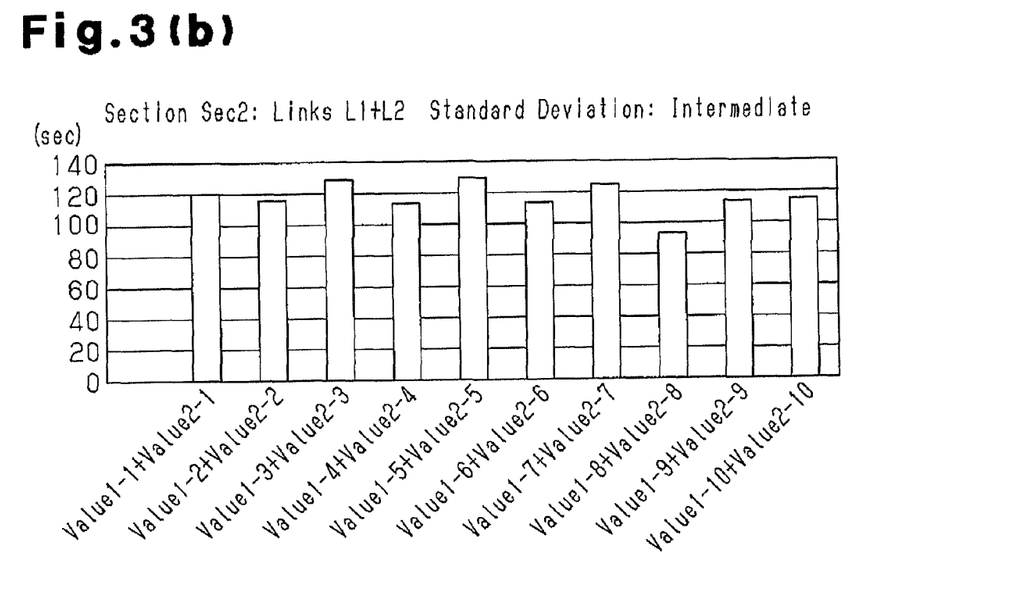

To reduce the standard deviation, as shown in FIG. 2(b), link L1 is combined with link L2, which is continuous with link L1. In other words, the end of the subject section is extended from node N2 to node N3, which follows node N2. Section Sec2, which combines links L1 and L2, is then set as a subject section. For the subject section, the standard deviation is calculated based on the sum of the link costs for links L1 and L2. FIG. 3(b) shows the distribution of the travel times for subject section Sec2 as the sums of the link costs for links L1 and L2. As shown in FIG. 3(b), the travel time for subject section Sec2, which is obtained by adding the travel time of link L2 to the travel time of link L1, has a smaller variation than the travel time for subject section Sec1 (link L1). As a result, the standard deviation for section Sec2, which combines links L1 and L2, is smaller than the standard deviation for section Sec1.

Figure 4A:
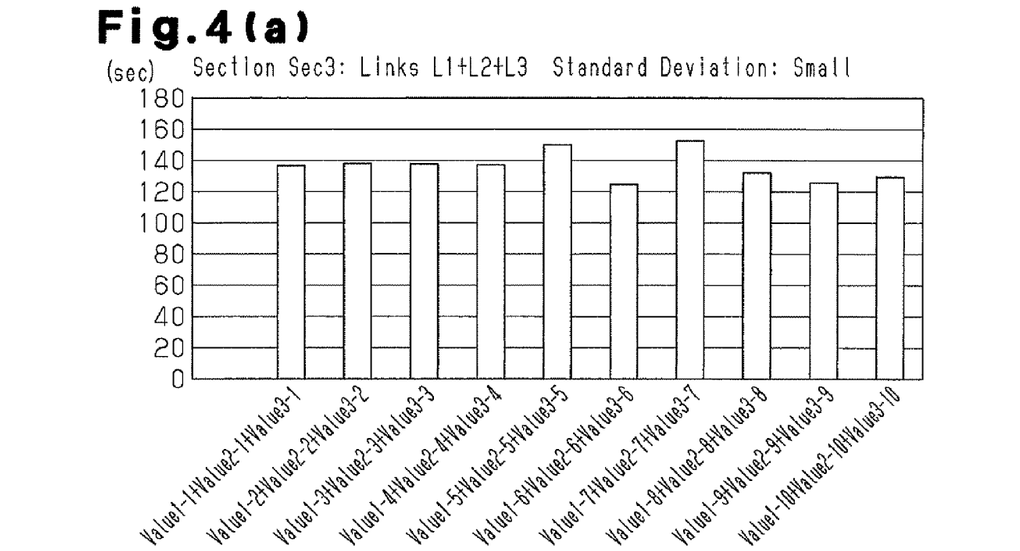
FIGS. 4(a) and 4(b) are graphs showing the standard deviation based on the sum of link costs included in the defined sections.

As shown in FIG. 2(c), links L1 and L2 (section Sec2) are further combined with link L3, which is continuous from link L2. In other words, the end of the subject section is further extended from node N3 to node N4, which follows node N3. Section Sec3, which combines links L1 to L3, is set as a subject section, for which the standard deviation is calculated based on the sum of the link costs for links L1 to L3. FIG. 4(a) shows the distribution of the travel times for subject section Sec3 as the sums of link costs for links L1 to L3. As shown in FIG. 4(a), the travel time calculated for subject section Sec3, which is obtained by adding the travel time of link L3 to the travel time of links L1 and L2, has a smaller variation than the travel time calculated for subject section Sec1 or the travel time calculated for subject section Sec2. As a result, the standard deviation of section Sec3, which combines links L1 to L3, is smaller than the standard deviation for section Sec1 or the standard deviation for section Sec2.

Figure 4B:
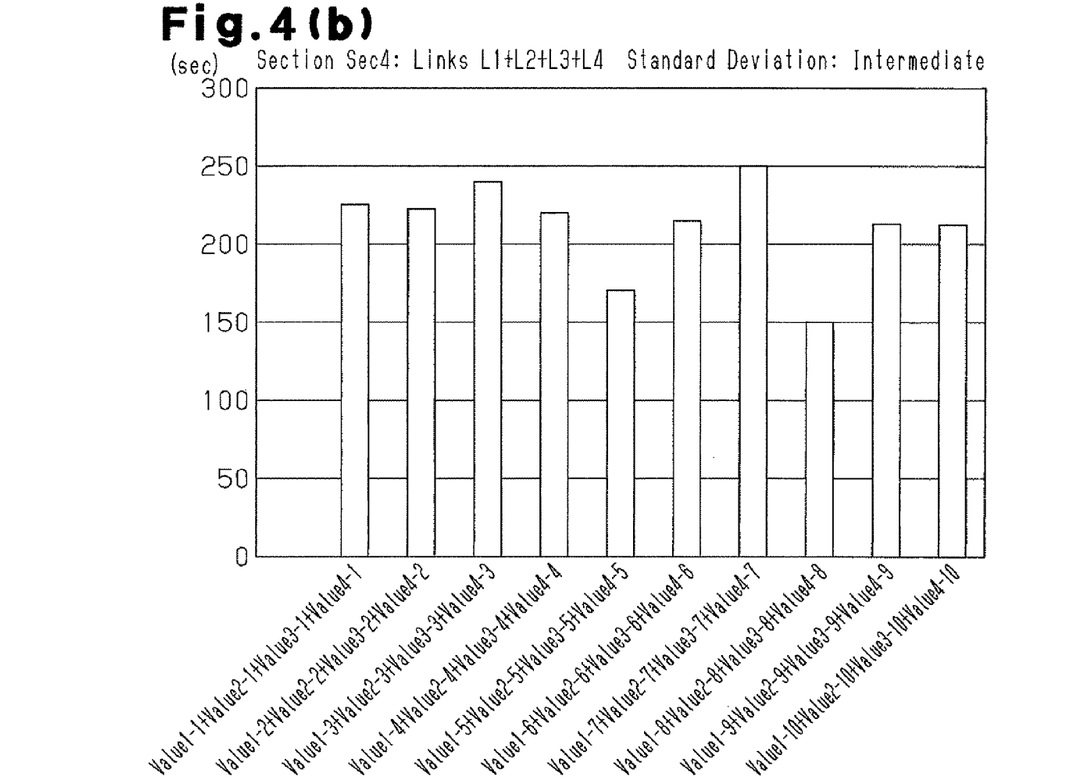

In the same manner, as shown in FIG. 2(d), links L3 (section Sec3) are combined with link L4, which is continuous from link L3. In other words, the end of the subject section is further extended from node N4 to node N5, which follows node N4. Section Sec4, which combines links L1 to L4, is set as a subject section, for which the standard deviation is calculated based on the sum of the link costs for links L1 to L4. FIG. 4(b) shows the distribution of the travel times for subject section Sec4 as the sums of the link costs for links L1 to L4. As shown in FIG. 4(b), the travel time for section Sec4, which is obtained by adding the travel time for link L4 to the sum of the travel time of links L1 to L3, has a larger variation than the travel time for section Sec3. The standard deviation for section Sec4, which combines links L1 to L4, is greater than the standard deviation for section Sec3.

In the present embodiment, a certain link is used as the starting point (first link) for defining sections, and the end of the subject section is extended by adding following links one after another so that the standard deviation based on the sums of the link costs within the subject link gradually decreases. When the standard deviation based on the sums of the link costs for the combined links increases again, the preceding section is defined as a section unit for which guide information is generated. Thus, in this example, section Sec3, which combines the continuous links L1 to L3, is defined as a section unit for which the guide information is generated. After the single section unit is defined, link L4, which is continuous from the defined section Sec3, is set as the starting point for defining the next section. Steps (A) to (C) described below are performed repeatedly. This divides the road for which guide information into a plurality of section units, each of which combines continuous links.

(A) Continuous links are combined.
(B) The standard deviation is calculated based on the sum of the link costs for the combined links.
(C) When the combination with the next continuous link increases the standard deviation, which is based on the sums of the link costs, the links up to the preceding one is defined as a single section unit.

Figures 5A, 5B:
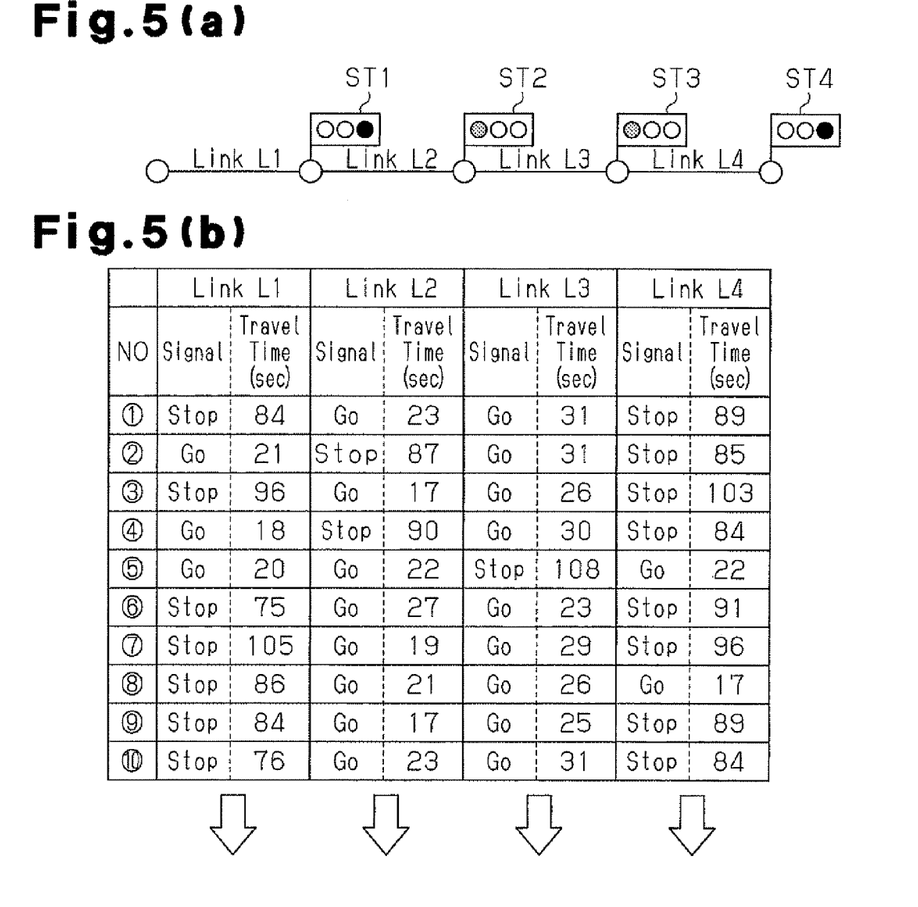
FIG. 5(a) is a schematic diagram showing one example of the condition of a road separated by traffic lights on intersections.
FIG. 5(b) is a diagram showing one example of travel times for the links separated by the traffic lights.
Figure 6:
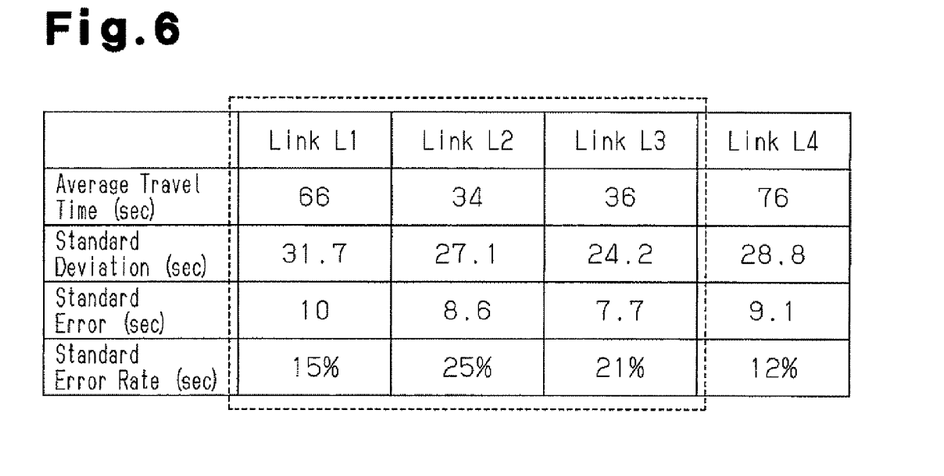
FIG. 6 is a table showing examples of the standard deviation, the standard error, and the standard error rate calculated for each section including a single link.
Figure 7A:
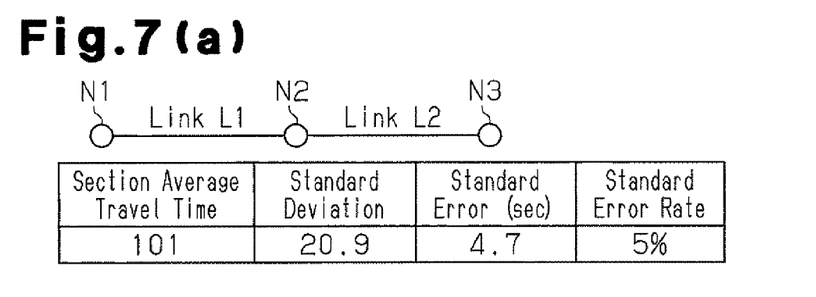
FIGS. 7(a) to 7(c) are tables showing examples of the standard deviation, the standard error, and the standard error rate calculated for each section including continuous links combined with one another.
Figure 7B:
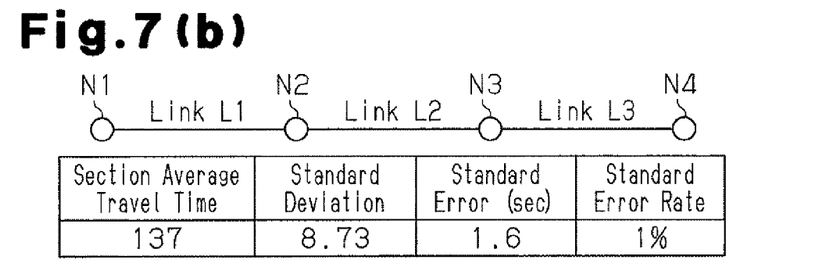
Figure 7C:
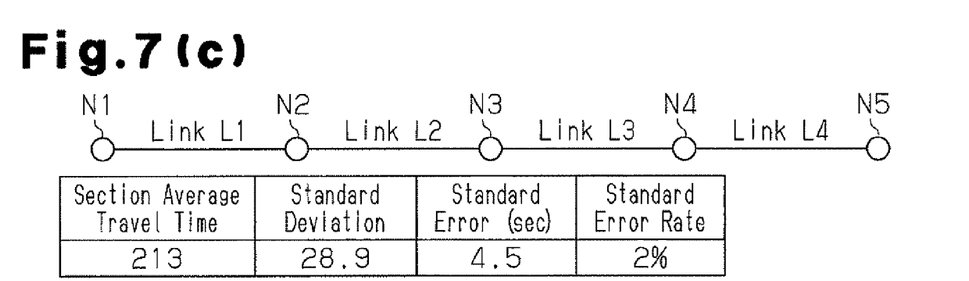

The standard error rate calculated for each section unit defined with the section defining method of the present embodiment will now be compared with the standard error rate calculated for each link with reference to FIGS. 5 to 7. FIG. 5(a) schematically shows an example of the condition of the road separated by traffic lights on intersections. FIG. 5(b) shows an example of the travel time for each vehicle in each link under this road condition. FIG. 6 shows examples of the standard deviation, the standard error, and the standard error rate calculated for each link separated by intersections, which is set as a single section unit. FIG. 7 shows examples of the standard deviation, the standard error, and the standard error rate calculated for each section defined with the section defining method of the present embodiment, which is set as a single section unit.

As shown in FIG. 5(a), a group of vehicles are traveling along a continuous road divided into links L1 to L4 by traffic lights ST1 to ST4. The travel time of each of the vehicles in each of links L1 to L4 is calculated based on probe information provided from the vehicles.

As shown in FIG. 5(b), for example, the calculated travel time varies within each link depending on, for example, whether or not the vehicles stop as the traffic lights ST1 to ST3, which separate links L1 to L4, turn red. The states of the traffic lights ST1 to ST4 are controlled in cooperation with one another based on a predetermined table.

The average travel time for each of links L1 to L4 is calculated using equation (1) shown below:

Equation 1

$$\bar{x} = \frac{1}{n}\sum_{i=1}^{n} x_i \quad (1)$$

where x is the average value of travel times based on probe information collected at each of the links L1 to L4, and n is the number of samples.

Using the above equation (1), the average travel time is calculated as 66 seconds for link L1, 34 seconds for link L2, 36 seconds for link L3, and 76 seconds for link L4.

The standard deviation based on the travel time for each of links L1 to L4 is calculated using equation (2) shown below:

Equation (2)

$$\sigma^2 = \frac{1}{n}\sum_{i=1}^{n}(x_i - \bar{x})^2 \quad (2)$$

where δ is the standard deviation, and n is the number of samples.

Using the above equation (2), the standard deviation is calculated as 31.7 for link L1, 27.1 for link L2, 24.2 for link L3, and 28.8 for link L4.

The standard error based on the standard deviation for each of links L1 to L4 is calculated using equation (3) shown below:

Equation (3)

$$SE = \frac{\sigma}{\sqrt{n}} \quad (3)$$

where SE is the standard error, and n is the number of samples.

Using the above equation (3), the standard error indicating the standard deviation for the sample statistic is calculated as 10 seconds for link L1, 8.6 seconds for link L2, 7.7 seconds for link L3, and 9.1 seconds for link L4.

The standard error rate serving as an index of an error for the link cost for each of links L1 to L4 is calculated using equation (4) shown below:

Equation (4)

$$Mp = \frac{SE}{x} \quad (4)$$

where Mp is the standard error rate.

Using the above equation (4), the standard error rate is calculated as 15% for link L1, 25% for link L2, 21% for link L3, and 12% for link L4.

When using a link as a unit like in the prior art and calculating, for example, the average travel time and the standard error for links L1 to L3 are calculated and obtained as described below.

Average travel time for links $L1$ to $L3$=66+34+36=136 (seconds)

Standard error for links $L1$ to $L3$=10+8.6+7.7=26.3 (seconds)

In this case, the standard error rate is calculated as 19%, based on the average travel time and the standard error calculated for links L1 to L3 using the above equation (4). In other words, this error would be reflected in the travel time from links L1 to L3 when using links as section units. As a result, the estimated time of arrival that is based on the travel time would also include an error.

In the present embodiment, as shown in FIG. 7(a), the standard deviation for the section combining the continuous links L1 and L2 is first calculated as 20.9 based on the above equation (2). In this case, the standard deviation is decreased when link L1 is combined with following link L2. For the section combining links L1 and L2, the average travel time is 101 seconds based on equation (1), the standard error is 4.7 seconds based on equation (3), and the standard error rate is 5% based on equation (4).

As shown in FIG. 7(b), the standard deviation for the section combining the continuous links L1 to L3 is calculated as 8.73 based on equation (2). The standard error rate for the section including links L1 to L3 is 1%. In the same manner, the standard deviation for the section combining the continuous links L1 to L4 is calculated as 28.9 based on equation (2).

The standard deviation obtained based on the sums of travel times increases from 8.73 to 28.9 when link L4 is additionally combined. Thus, the section including the links up to preceding link L4, the continuous links L1 to L3, is determined as an optimum section for generating the guide information. The standard error rate calculated for the travel times for links L1 to L3 included in the defined section unit is 1%, which is significantly smaller than the standard error rate (19%) obtained when each link is used as a single section unit.

In the present embodiment, continuous links are combined to yield a decrease in the standard deviation, and the travel time is calculated for the section combining links as a single section unit. This minimizes the error rate of the travel time calculated for the section unit. Based on the travel time calculated with this method, the car navigation system 200 calculates the estimated time of arrival from the departure point to the destination point. Thus, the estimated time of arrival can be calculated with high accuracy.

The procedures for defining sections with the section defining method of the present embodiment will now be described with reference to FIG. 8.

Figure 8:
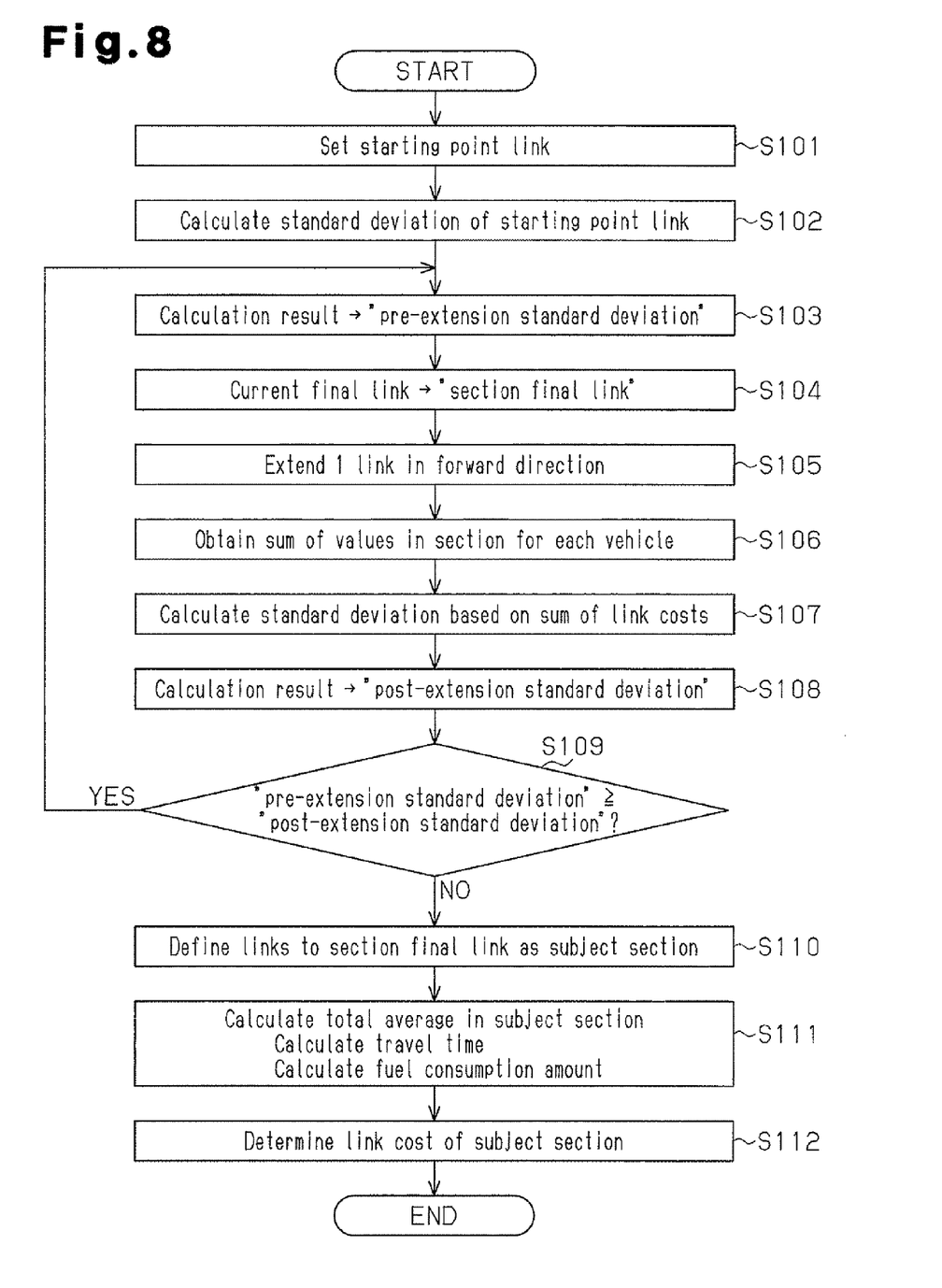
FIG. 8 is a flowchart showing the procedures for defining a section in the present embodiment.

In step S101, as shown in FIG. 8, one link is set as a starting point for combining continuous links. As described above, the link at the starting point is preferably a link that is not included in any section that has been defined as a single section unit or a link corresponding to the beginning or the end of a road, such as a highway interchange or an intersection of main roads.

After the starting point link is set, the standard deviation of the link cost for the first link is calculated (step S102). The calculated standard deviation is stored as the standard deviation before combining a continuous link, that is, before extending the section defined as a section unit (step S103). Subsequently, the last one of the combined links included in the currently defined section is stored as the link at the end of the section (step S104).

After the standard deviation and the last link of the section are stored, a link continuous to the current last link is further combined with the defined section. In other words, the end point of the section to be defined is extended by another link (step S105). The sums of the link costs for the extended section is then calculated based on probe information provided from the vehicles traveling along the section (step S106). Based on the sums of the link costs calculated for the vehicles traveling along the section, the standard deviation of the link cost is calculated for the current subject section (step S107). The standard deviation calculated based on the sums of the link costs for the extended section is then stored as the value after the section is extended (step S108).

In step S109, the standard deviation values before and after the section extension are compared with each other. When the value after the extension is greater than the value before the extension, the section from the starting point link to the last link specified in step S104 is defined as the section unit for which the guide information is to be generated (step S109: NO, S110). After the subject section unit is defined, the average values of the link costs for different link cost elements are calculated by using the link costs for all the links included in the defined section unit (step S111). In this example, the travel times and the fuel consumption amounts required by the vehicles traveling along the section unit are averaged to calculate the travel time and the fuel consumption amount that serve as the cost for the section unit. The resulting average value calculated for each element is determined as the link cost for the defined section unit (step S112).

When the standard deviation values before and after the section extension that have been stored are compared with each other in step S109 and the value after the extension is smaller than the value before the extension, the processing returns to step S103, in which the standard deviation after the extension is newly stored as the pre-extension standard deviation (step S109: YES, S103). A continuous link is additionally combined until the standard deviation after the extension becomes greater than the standard deviation before the extension.

As described above, the section is defined by combining continuous links and the costs are calculated for the defined section. The link immediately continuous from the last link of the defined section is subsequently used as the first link of the next section, which is defined through the processing in steps S101 to S112. In this manner, the link that has been included in the subject section unit separating the continuous road may be used as a link to form a new section unit.

The section defining method, the travel time calculation device, and the drive assistance device of the present embodiment have the advantages described below.

(1) A section for which the link cost has a smaller standard deviation is newly defined by combining continuous links that yield a decrease in standard deviation based on the sums of link costs. The guide information is then generated based on the sum of link costs within the defined section. This enables guide information with a higher accuracy to be generated and improves the reliability of the guide information.

(2) Two or more continuous links are combined. Thus, links having a short length or links having a large variation in the travel time due to the changing states of traffic lights can be used to define a section having a smaller variation in the travel time.

(3) Each single section unit is defined with the above method by repeating steps (I) and (II) described below.

(I) At least two continuous links are combined to yield a decrease in the standard deviation based on the sum of link costs.

(II) When the standard deviation based on the sum of the link costs for the combined links and the link cost for an additional link continuous from the combined links is greater than the standard deviation for the combined links, the section including the links immediately preceding the additional link is defined as a section unit.

The section for which guide information is to be generated is extended to add continuous links one after another as long as such addition decreases the sums of the link costs when combining continuous links.

(4) The above method repeats the processes so that the road on which vehicles travel is seamlessly defined into a plurality of section units. Thus, sections can easily be defined to yield a decrease in the standard deviation based on the sums of link costs, and the sections can be defined by combining the required minimum number of link costs. The above method enables more practical section definition by combining continuous links in each section to yield a decrease in the standard deviation.

(5) The link cost for each link is calculated based on the travel time and the fuel consumption amount of the corresponding link. In this case, the travel time to the destination point and the route that consumes less fuel, which are used as guide information provided to the driver of the vehicle, are calculated with higher accuracy.

(6) The elements used to calculate the link cost are collected based on probe information provided from vehicles driving traveling along each link. This enables the elements of information including the travel time and the fuel consumption amount for each link to be collected with higher accuracy. As a result, the link cost can be calculated with higher accuracy based on these elements. This improves the reliability of defining sections based on the link costs.

(7) The management center 100 collects the probe information and defines sections based on the probe information. This enables the collection of the elements used to calculate the link cost and the defining of sections based on these elements to be performed at one place, namely, the management center 100.

(8) The travel time for each section defined with the above section defining method, which is used for generating the guide information, is calculated as the average value of the travel times of links included in each section. This enables the travel time of each section to be calculated based on elements with smaller variations, and also minimizes error between the calculated travel time and the actual travel time required to travel along each section. This improves the reliability of the travel time, which is used to generate guide information.

(9) The travel time or the fuel consumption amount for each section defined with the above section defining method is calculated as the average value of the travel times or the fuel consumption amounts of links included in each section. The calculated travel time or the calculated fuel consumption amount is then used to generate route information, which is to be provided to the driver of each vehicle. This improves the reliability of the route information, which is generated based on the travel time or the fuel consumption amount, and improves the reliability of the drive assistance device.

The above embodiment may be modified in the following forms.

Figure 9:
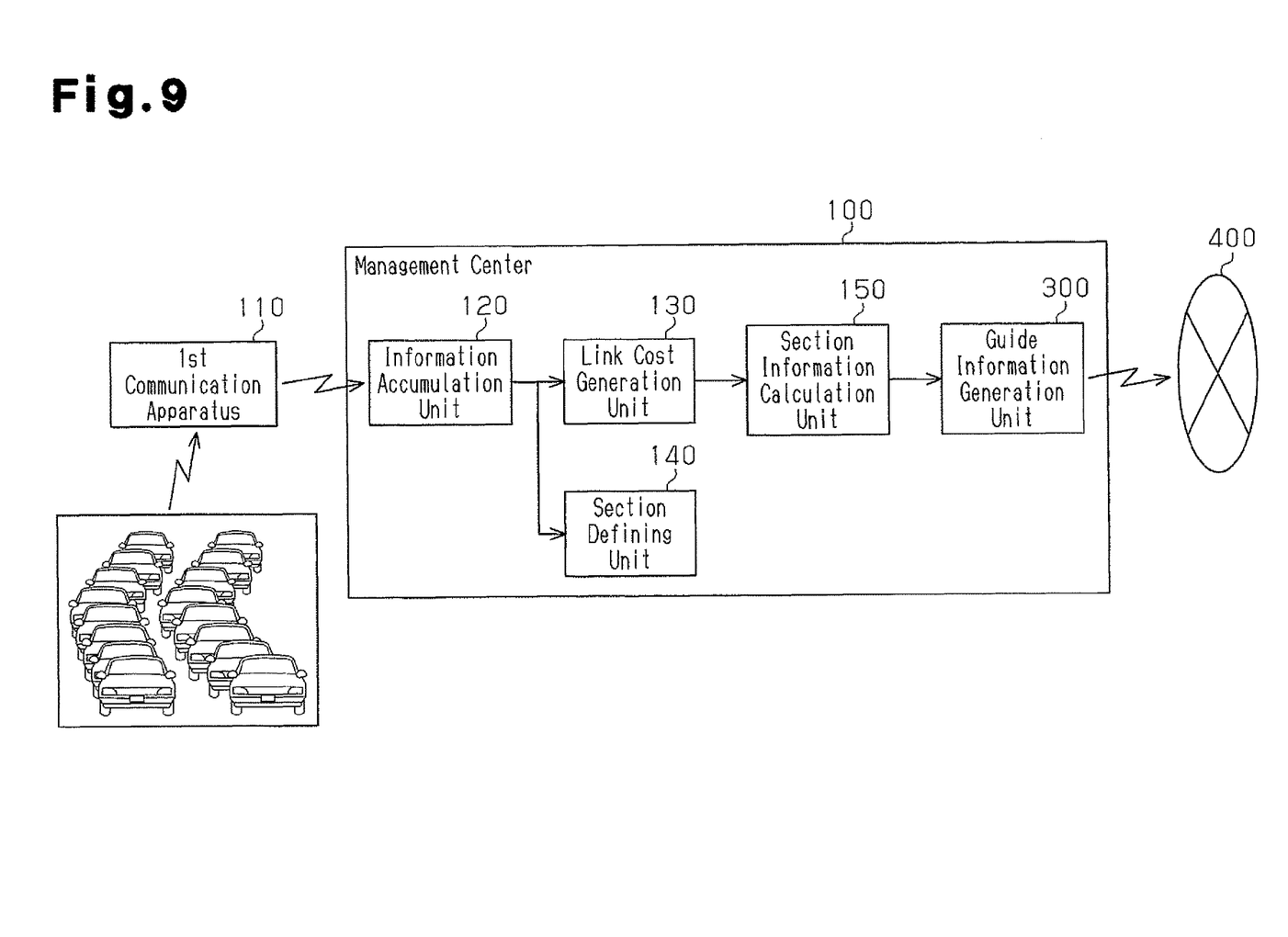
FIG. 9 is a conceptual block diagram of a system related with a section defining method, a travel time calculation device, and a drive assistance device in another embodiment.

In the above embodiment, information related to the travel time and the fuel consumption amount for each section calculated by the section information calculation unit 150 is distributed to the car navigation system 200 in response to a request from the car navigation system 200. The car navigation system 200 then generates the guide information based on the distributed information related to the travel time or the fuel consumption amount. Alternatively, the management center 100 may include a guide information generation unit 300 as shown in, for example, FIG. 9, which corresponds to FIG. 1. The guide information generation unit 300 generates guide information based on information related to the travel time and the fuel consumption amount, which are calculated by the section information calculation unit 150. The guide information, which is generated by the guide information generation unit 300, may then be distributed to various terminals via a communication medium, such as the Internet 400. In this modification, the management center 100 functions as the drive assistance device.

In the above embodiment, the average travel time and the average fuel consumption amount are calculated as the average values of the link costs for the links included in the defined section. The present invention should not be limited to this structure. Only the travel time may be calculated through the processing in step S111 shown in FIG. 7. In this modification, the section information calculation unit 150 still functions as the travel time calculation device.

In the above embodiment, the sum of link costs for the links included in the defined section is averaged, and the resulting average value is used as the cost for each defined section. The present invention should not be limited to this structure. The link costs included in the defined section may be classified into different elements for which the link cost varies, such as the time or the weather. The sum of link costs may be averaged for each of the classified elements, and the resulting average value for each element may then be used as the cost for the corresponding defined section. This enables the cost for each section to be obtained in accordance with the time zone or the weather. As a result, guide information having a higher accuracy can be generated based on such cost generated for each section.

The link cost for each section is calculated by using the travel time and the fuel consumption amount of the vehicle driving on each link. Alternatively, the link cost for each link may be calculated based on at least one element of the corresponding link selected from the road width, the road shape, or the distance. It is only required that the link cost be a value that can serve as an index indicating ease of travel for each link. With the above method, sections can be defined to have smaller variations in their link costs. This enables reliable guide information for the defined sections to be provided.

In the above embodiment, the probe information is provided (transferred) to the management center 100 from the vehicles driving on each link. The management center 100 calculates the link costs and defines sections based on the obtained probe information. The present invention should not be limited to this structure. The elements used to calculate the link costs may for example be calculated based on traffic information collected at the VICS center, which is a management center for the VICS. The VICS center may then calculate the link costs and define sections based on the traffic information collected at the center.

Alternatively, each vehicle may use, for example, a navigation system to calculate the link costs and define sections by using a communication system, such as a vehicle-to-vehicle communication system or a road-to-vehicle communication system.

Alternatively, the cost for each defined section may be registered with map information stored by, for example, the car navigation system, and the guide information may be generated based on the registered cost for each section.

In the present embodiment, when the standard deviation based on the sum of the link costs for the combined links and the link cost for an additional link continuous from the combined links is greater than the standard deviation for the combined links, the section including the links immediately preceding the additional link is defined as a section unit. The section for which guide information is to be generated may be defined by freely combining continuous links. It is only required that the section be defined by combining at least two continuous links that yield a decrease in the standard deviation.

The invention claimed is:

1. A section defining method that separates a road between a departure point and a destination point into a plurality of links under a predetermined condition and defines a section based on a link cost, which is an index indicating ease of travel and set for each link, the section being used to generate guide information provided to a driver of a vehicle, the method comprising:
    defining the section by combining, among the plurality of links between the departure point and the destination point, at least two continuous links that yield a decrease in standard deviation, which is based on sums of the link costs, wherein the section that combines at least two continuous links that yield a decrease in standard deviation, which is based on sums of link costs, is defined as a single section unit;
    combining at least two continuous links that yield a decrease in standard deviation, which is based on sums of link costs to obtain link combination; and
    setting the link combination as the single section unit when a standard deviation that is based on the sums of the link costs obtained when the link combination is combined with the next continuous link is greater than the standard deviation corresponding to the link, combination,
    wherein a plurality of section units are defined by sequentially repeating the combining and the setting from the departure point.

2. The section defining method according to claim 1, wherein the link cost is calculated based on at least one element of travel time, fuel consumption amount, road width, and distance in the corresponding link.

3. The section defining method according to claim 2, wherein
    the element used for calculating the link cost is collected based on information transferred from a plurality of vehicles having wireless communication capabilities that are traveling along the same link to a management center of a probe information communication system,
    the link cost evaluated when defining the section is calculated at the management center, and
    the section is defined at the management center based on the calculated link cost.

4. A travel time calculation device that separates a road between a departure point and a destination point into a plurality of links under a predetermined condition and calculates travel time based on travel time information included in a link cost, which is an index indicating ease of travel and set for each link, the travel time being used to generate guide information provided to a driver of a vehicle,
    wherein the travel time calculation device calculates the travel time for each section defined by the section defining method according to claim 1 as an average value of the travel times of links included in the corresponding section.

5. The travel time calculation device according to claim 4, wherein
    the travel time for each link and the travel time for each defined section are calculated at a management center of a probe information communication system based on information transferred to the management center from a plurality of vehicles having wireless communication capabilities that are traveling along the same link, and
    among the calculated travel times, the travel time for each defined section is provided from the management center in response to a request.

6. A drive assistance device that separates a road between a departure point and a destination point into a plurality of links under a predetermined condition and generates route information, which is provided to a driver of a vehicle, based on travel time information or a fuel consumption amount that are included in a link cost, which is an index of ease of travel and set for each link,
    wherein the drive assistance device calculates travel time or fuel consumption amount for each section defined with the section defining method according to claim 1 as an average value of the travel times or the fuel consumption amounts of links included in each section and generates the route information based on the calculated travel time or fuel consumption amount.

7. The drive assistance device according to claim 6, wherein
    the travel time or the fuel consumption amount for each link and the travel time or the fuel consumption amount for each defined section are calculated at a management center of a probe information communication system based on information transferred to the management center from a plurality of vehicles having wireless communication capabilities that are traveling along the same link, and
    among the calculated travel times or fuel consumption amounts, the travel time or the fuel consumption for each defined section is provided as information used to generate the route information from the management center in response to a request.

* * * * *